United States Patent [19]

Hümmler

[11] 4,431,170
[45] Feb. 14, 1984

[54] DEVICE FOR THE MANIPULATION OF IMMERSION LANCES FOR METALLURGICAL FURNACES

[76] Inventor: Otto Hümmler, Hofgutstrasse 21, D-5900 Siegen 1, Fed. Rep. of Germany

[21] Appl. No.: 426,186

[22] Filed: Sep. 28, 1982

[30] Foreign Application Priority Data

Oct. 26, 1981 [DE] Fed. Rep. of Germany ....... 3142433

[51] Int. Cl.³ .............................................. C21C 5/30
[52] U.S. Cl. ..................................... 266/226; 266/287
[58] Field of Search ............... 266/225, 226, 287, 265; 414/705, 743

[56] References Cited

U.S. PATENT DOCUMENTS 2,924,345 2/1960 Bodin .................................. 414/705
3,439,912 4/1969 Berger .................................. 266/226

Primary Examiner—L. Dewayne Rutledge
Assistant Examiner—Robert McDowell
Attorney, Agent, or Firm—Young & Thompson

[57] ABSTRACT

A device for the manipulation of immersion lances (5) for metallurgical furnaces (9) with the aid of a freely movable vehicle, for example a charging machine (2), comprises a lance mounting (3) which can be suspended at the head of the supporting arm (1) of a charging machine (2) or the like, the mounting being supported to be rotatable about two swivel and tilting axes (4—4, 6—6) extending at right angles to each other, separate hydraulic drive mechanisms for the swiveling and tiling motions of the immersion lance (5) being arranged in the charging machine (2) or the like and being connected to the lance mounting (3) by way of linkages (13, 17). Reversing valves correspondingly coupled with one another take care of deactivating and blocking the drive mechanisms of the machine not required for the movement of the lance (5).

4 Claims, 3 Drawing Figures

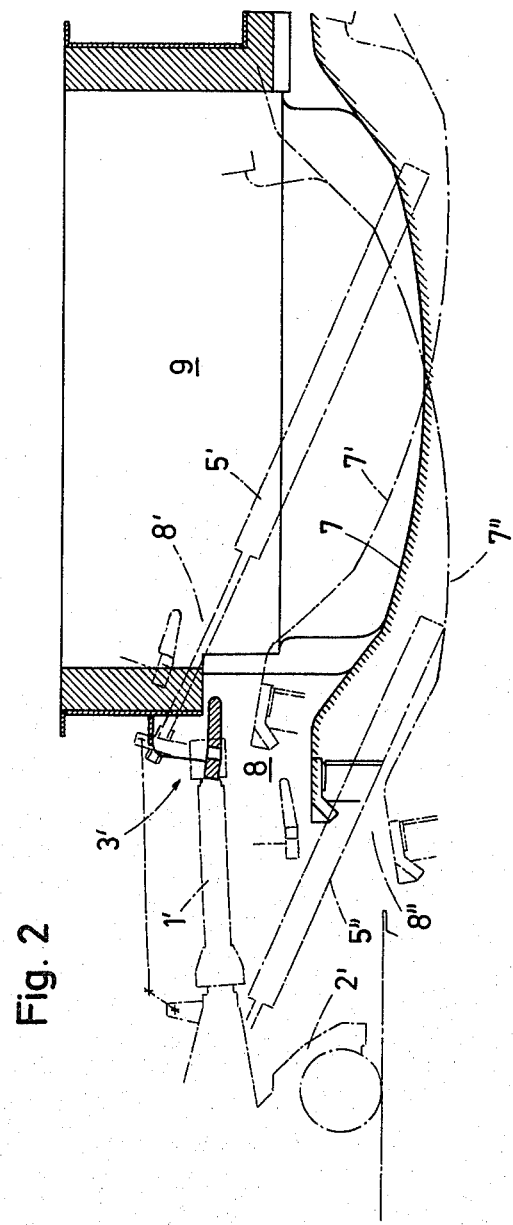

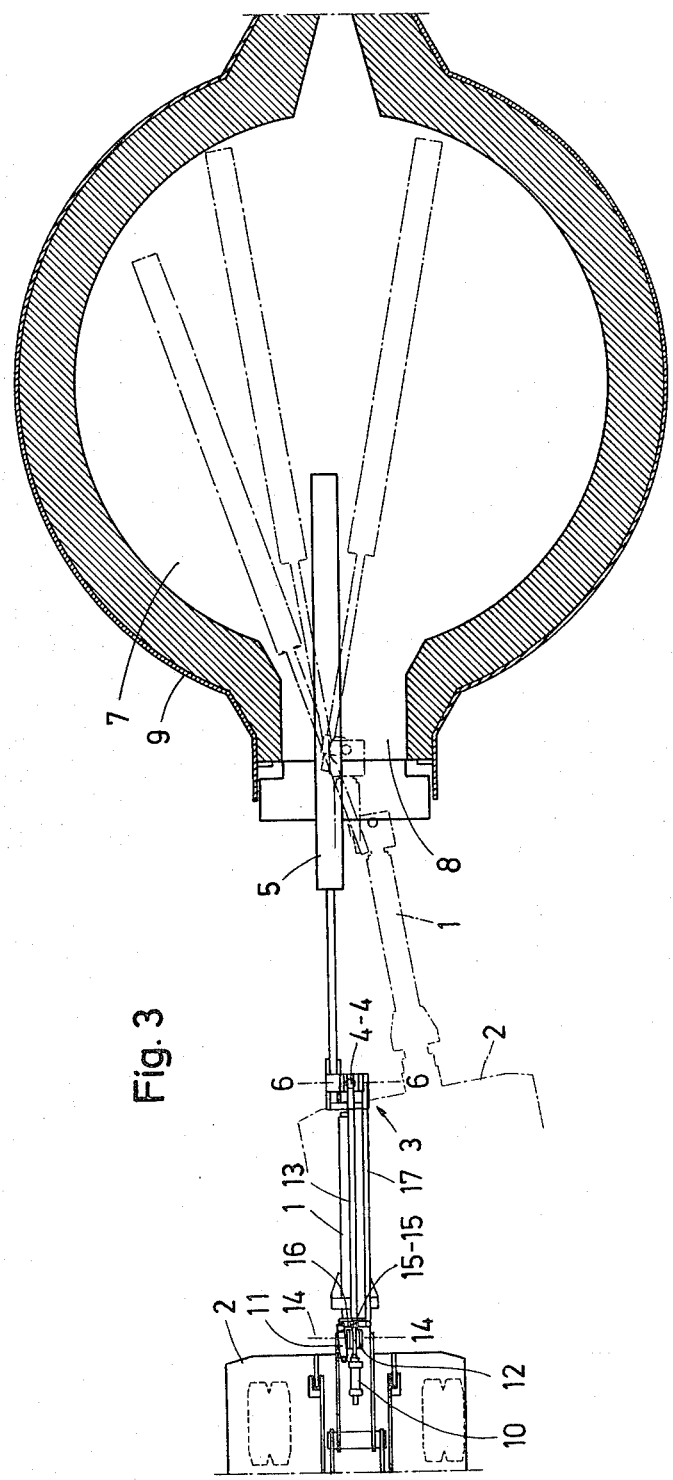

DEVICE FOR THE MANIPULATION OF IMMERSION LANCES FOR METALLURGICAL FURNACES

The invention relates to a device for the manipulation of immersion lances for metallurgical furnaces with the aid of a freely movable vehicle, for example a charging machine.

It is known to manually insert an immersion lance in the furnace, after arranging a protective shield in front of the furnace throat, in order to blow in gaseous materials, e.g. oxygen for scrap combustion or molten bath refining. Later on, the practice was adopted to arrange a lance, with a corresponding head portion, at the front end of the supporting arm of a charging machine. The tilting position of the lance is manually adjustable but, within the furnace, can be altered only in a very limited fashion with the aid of the entire supporting arm of the charging machine, so that a uniform "inoculation" of the molten bath is not achieved thereby.

Modern developments in the blowing-in technique also provide the introduction, together with a gas, of pulverized solids, for example lime, calcium carbide, magnesium, carbon, aluminum, or other alloy components. For this purpose, appropriate immersion or blow-in lances have been developed as described, for example, in German Pat. No. 2,528,672. By the blowing in of gas and solids, the metallurgical process is substantially accelerated, since the materials are more thoroughly distributed, and thus the molten bath is more effectively "inoculated". However, manipulation of the immersion lance within the furnace still represents a problem because during swiveling and/or tilting of the lance by means of the supporting arm of the charging machine, not every region of the molten bath can be reached with the lance tip since the swiveling and tilting axes are too far remote from the furnace.

The invention is based on the object of providing a device permitting an optimum manipulating effect.

This object has been solved according to the invention by a lance mounting which can be hung in place at the head of the supporting arm of the charging machine, the mounting being supported to be rotatable about two swiveling and tilting axes extending at right angles to each other, wherein separate drive mechanisms are arranged in the charging machine for the swiveling motion and for the tilting motion of the immersion lance and are connected via linkages to the lance mounting.

In this connection, the drive mechanisms of the immersion lance are suitably constituted by hydraulic cylinders integrated into the hydraulic system of the charging machine and controllable via correspondingly coupled-together reversing or switchover valves with deactivation and blockage of the drive mechanisms not required for the movement of the lance.

The lance manipulating device of this invention makes it possible to displace the tilting and swiveling axes for the immersion lance up into the throat of the metallurgical furnace so that it is possible by means of the lance to cover larger angular areas in each direction. Thereby, an even better and faster distribution of gas and solids in the molten bath is made possible, resulting in an additional shortening of the metallurgical process and in quality improvement of the product. By integrating the hydraulic mechanisms for the swiveling and tilting of the lance into the charging machine, these mechanisms are protected and thus remain functional over a long period of time. By the possibility of switching over the drive mechanisms of the charging machine, i.e. from box charging to lance manipulation, erroneous operations and damage to the charging machine or to the manipulating device are avoided since upon activation of the drive mechanisms for the manipulating device, the hydraulic drive mechanisms for the rotation of the supporting arm and the unlocking of the head portion thereof, i.e. release of the lance mounting from the supporting arm, are hydraulically blocked.

The drawings illustrate an embodiment of the invention in a schematic view.

In the drawings:

FIG. 2 is a lateral view of the immersion lance in various tilting positions within the furnace, and FIG. 3 is a top view with various swiveling positions of the lance within the furnace.

Figure 1:
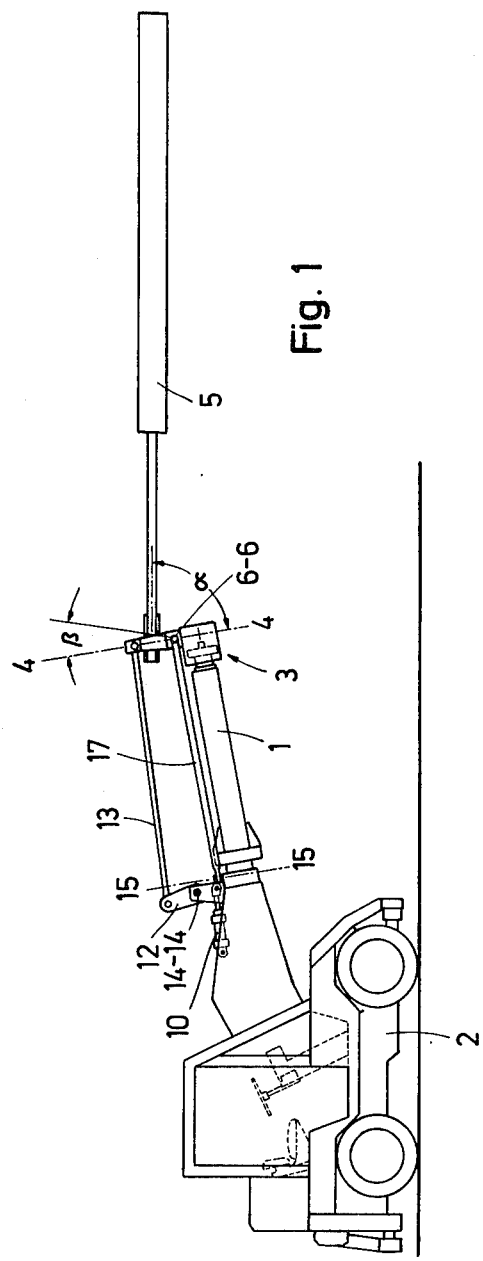
FIG. 1 is a lateral view of the manipulating device.

At the front end of the supporting arm 1 of a charging machine 2, a lance mounting 3 is suspended and locked in place, instead of a charging box. An immersion lance 5 is attached to this mounting 3 at a predetermined angle $\alpha$ with respect to a swivel axis 4—4 for the mounting 3. The connecting conduits for gas and solids for this lance are not illustrated for the sake of simplicity. The mounting 3 with the lance 5 can be tilted about a substantially horizontally extending tilting axis 6—6, for example by an angle $\beta$ of 20°. FIG. 1 shows the highest possible position of the lance 5. In the position shown in FIG. 2 with dot-dash lines, wherein the supporting arm is denoted by 1', the charging machine by 2', and the lance by 5', the lance 5' is in a tippable furnace 9, for example an electric furnace, the bottom of which at 7' is illustrated in a position tilted rearwardly by about 10°. It can be seen that the lance mounting 3' is almost within the furnace throat 8' and can even by moved right into this throat, the lance 5' being tilted downwardly about the axis 6—6 within the mounting 3'. At 7, the furnace bottom is shown in solid lines while the bottom, at 7", is forwardly tilted by about 10°. In this position, the lance is indicated at 5".

FIG. 3 shows in a top view the ranges over which the lance 5 can be laterally swiveled so that practically any point within the furnace 9 can be covered by the lance 5, since in each instance the tilting axis 6—6 and the swiveling axis 4—4 are maximally close to the furnace throat 8.

A hydraulic cylinder 10 is arranged at the charging machine 2 for the tilting drive mechanism of the lance 5, while a hydraulic cylinder 11 effects the swiveling of the lance 5. The piston of the hydraulic cylinder 10 acts on one of the arms of a two-armed lever 12, the other arm of which is joined via a linkage 13 to the lance mounting 3. The lever 12 is supported to be rotatable about a substantially horizontal axis 14—14. The hydraulic cylinder 11 for the lateral swiveling of the lance 5 about the axis 4—4 acts on one of the arms of a two-armed lever 16, pivotably mounted about an axis 15—15 extending approximately perpendicularly to the supporting arm 1; the other arm of this lever 16 is connected to the lance mounting 3 by way of a linkage 17.

The aforementioned reversing valves of the charging machine, which, upon activation of the drive mechanisms for the lance manipulation, deactivate and block the drive mechanisms for the rotation of the supporting arm 1 about its own axis and for the unlocking of the lance mounting 3 from the head of the supporting arm 1, are not illustrated in the drawing.

The utilization of the lance manipulating device of this invention has been described hereinabove in conjunction with a charging machine. However, the scope of this invention also covers the possibility of using, instead of a charging machine, a similar, freely mobile vehicle.

What is claimed is:

1. Device for the manipulation of immersion lances for metallurgical furnaces, comprising a freely movable vehicle (2), having a forwardly extending supporting arm (1), a lance mounting (3) detachably mounted on the forward end of the supporting arm (1), means supporting said mounting on said arm about two swiveling and tilting axes (4—4, 6—6) extending at right angles to each other and to said supporting arm (1), said swiveling axis (4—4) being upright and said tilting axis (6—6) being horizontal, separate drive mechanisms (10, 11) for the swiveling and tilting motions of the immersion lance (5) carried by the vehicle (2), and linkages (13, 17) by which said drive mechanisms (10, 11) are connected to the lance mounting (3).

2. Device according to claim 1, in which said drive mechanisms of the immersion lance (5) are hydraulic cylinders (10, 11).

3. Device according to claim 1, in which said axes (4—4, 6—6) are disposed at the outer end of said arm (1).

4. Device according to claim 1, in which said linkages (13, 17) extend substantially parallel to said supporting arm (1).

* * * * *